US008808081B1

(12) United States Patent
Healy

(10) Patent No.: US 8,808,081 B1
(45) Date of Patent: Aug. 19, 2014

(54) MULTIPLAYER BINGO WITH TWIN WIN INTERMEDIATE AWARD

(75) Inventor: Noah Patrick Healy, Charlottesville, VA (US)

(73) Assignee: Video Gaming Technologies, Inc., Brentwood, TN (US)

( * ) Notice: Subject to any disclaimer, the term of this patent is extended or adjusted under 35 U.S.C. 154(b) by 49 days.

(21) Appl. No.: 13/223,444

(22) Filed: Sep. 1, 2011

(51) Int. Cl.
*A63F 13/00* (2014.01)

(52) U.S. Cl.
USPC .................. 463/19; 463/16; 463/17; 463/18; 463/25; 463/27

(58) Field of Classification Search
USPC ......... 463/16, 17–24, 25–27, 29, 1, 5–11, 13, 463/14, 28–32; 273/138.1, 138.2, 141 A, 273/142 B, 142 C, 142 J, 269, 296
IPC .................... G06F 19/00; A63F 9/00,9/24, 1/18
See application file for complete search history.

(56) References Cited

U.S. PATENT DOCUMENTS 4,611,811 A * 9/1986 Haase ............................ 463/19
4,624,462 A * 11/1986 Itkis ............................ 273/237
5,624,119 A * 4/1997 Leake ............................ 273/269
5,727,786 A 3/1998 Weingardt
5,882,260 A * 3/1999 Marks et al. ............................ 463/13
6,186,892 B1 * 2/2001 Frank et al. ............................ 463/19
6,280,325 B1 * 8/2001 Fisk ............................ 463/19
6,585,590 B2 * 7/2003 Malone ............................ 463/19
6,616,531 B1 * 9/2003 Mullins ............................ 463/19
6,755,738 B2 6/2004 Glasson et al.
7,481,707 B1 1/2009 Luciano, Jr. et al.
7,614,948 B2 11/2009 Saffari et al.
7,666,084 B2 2/2010 Herrman et al.
8,025,567 B2 * 9/2011 Kane et al. ............................ 463/29
2004/0178579 A1 9/2004 Lowell et al.
2005/0043079 A1 2/2005 Huang
2005/0164772 A1 7/2005 Lind et al.
2005/0261050 A1 * 11/2005 Waters ............................ 463/19
2006/0205468 A1 9/2006 Saffari et al.
2007/0093285 A1 * 4/2007 Lee ............................ 463/19
2007/0123329 A1 5/2007 Frank et al.
2008/0188279 A1 8/2008 Seelig et al.
2009/0075715 A1 3/2009 Coleman et al.
2009/0318231 A1 12/2009 Lange
2010/0120489 A1 5/2010 Meyer

FOREIGN PATENT DOCUMENTS

GB 1237010 A 6/1971

* cited by examiner

*Primary Examiner* — Sunit Pandya
(74) *Attorney, Agent, or Firm* — Phillip E. Walker; Waddey Patterson P.C.

(57) ABSTRACT

A system and method for conducting a multi-player wagered networked bingo game. The system comprises a game controller operatively connected to at least two client devices. The game controller is preferably programmed to operate the networked bingo game and form patterns on a playing pieces associated with each client device. The game controller is preferably programmed to compare a plurality of intermediate patterns on each playing piece associated with each client device to determine if one of the intermediate patterns from the playing piece on at least two different client devices identically matches. The game controller can also be programmed to award an intermediate prize to each client device with the identically matched intermediate pattern and to conclude the networked bingo game when at least one pattern on the playing piece of at least one client device matches a game ending pattern.

22 Claims, 19 Drawing Sheets

MULTIPLAYER BINGO WITH TWIN WIN INTERMEDIATE AWARD

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

FIELD OF THE INVENTION

The present disclosure relates to gaming networks and, more particularly, to a gaming network providing a multiplayer networked bingo game wherein intermediate awards are given on the occurrence of matched patterns by two different players during the gaming event.

BACKGROUND OF THE INVENTION

Gaming machines which provide players awards are well known in the art. These gaming machines generally require the player to make a wager to activate the primary or base game. To obtain the award, the player typically is needs to obtaining a winning symbol, or symbol combination, in the primary game. The value of the award varies with the amount of the wager, with the award increasing with an increasing wager. Generally, the gaming machines provide higher awards on the occurrence of specific symbols, or symbol combinations, which are less likely to appear.

Secondary games, or bonus games, are also well known in gaming machine art. The bonus games usually provide an additional award to the player on the occurrence of an event during the course of the primary game. The bonus games add to the enjoyment and excitement of playing certain gaming machines, sometimes even before the player knows the value of the bonus award.

Bonus games vary in their requirements for play during the primary game. Some bonus games are activated automatically while others require player activation. For instance, some gaming machines require the player to wager the maximum amount for eligibility for the bonus game. Other gaming machines require the player to make an additional wager before that player is eligible for the bonus game. Still other gaming machines require a symbol occurring in one or more locations during the primary game—such as a special symbol appearing on the pay line on the one specific reel of a multi-reel slot machine—to trigger the bonus game.

When a bonus game is triggered, the gaming machines generally indicate this trigger to the player through various visual and/or audio output devices, (e.g. video screens, reels, lights, speakers, etc.) Once activated, some bonus games proceed automatically while others require some level of player interaction. This interaction can be in the form of affirmative selections or other decisions that affect the outcome of the bonus game. Typically, the player is provided instructions and information about the play of the bonus game. These instructions and information often appear on the display device at the gaming machine being played.

Various awards can be available to multiple gaming machines or groups of gaming machines. For example, a progressive jackpot award, or progressive award, is typically an award amount available to multiple gaming machines at the same time. This type of award typically increases by allocating a portion of each wager made on the gaming machines having the progressive award to the progressive award value. For example, a portion of each wager on the primary game of the gaming machine can be allocated to the progressive award. Depending on the particular gaming machine with the progressive award, the award maybe a self-contained jackpot, wherein the jackpot grows with every play on a particular machine, or the progressive award is facilitated between two or more gaming machines connected to a common progressive jackpot, each of which individually contribute to the jackpot and have the ability to win that jack pot.

The connection between the gaming machines which are involved in and are eligible for the progressive jackpot game and the associated progressive award vary. For example, a local area network ("LAN") may connect the gaming machines from the same bank of machines at a certain location on the casino floor or even various locations of machines in the same casino. Alternately, a wide area network ("WAN") can connect machines in two or more different casinos, or gaming establishments. Other networked systems, for example systems using the Internet, can connect remote players at various locations such that eligibility could be worldwide.

Bingo is an example of a game that is also played on gaming machines. These games also typically require a wager and have multiple potential outcomes wherein the random outcome is generated and displayed to each of the participating players.

The gaming machine based upon a bingo game has playing pieces, or playing grids or playing cards, bearing numbers or other designations in which the participant, or player, covers such numbers or designations on the playing card after a central control system selects a similarly numbered, or designated, object. The selection can be by a draw or by an electronic determination, where both are typically referred to as a ball draw. The bingo game is won by the first person covering a previously designated arrangement of numbers or designations on one of the playing pieces. Bingo is typically played with a variable number of bingo cards resulting from varying numbers of players and individual players playing numerous bingo cards. For a given game winning, or ending, pattern, the expected number of balls drawn during a ball draw in order for at least one bingo card to match the game ending pattern will vary with the number of bingo cards played in that bingo game.

It is known in the art that a bingo game may include interim winners of prizes based on matching predetermined interim patterns on the bingo card using the same ball draw used to determine the gaming ending pattern. The interim pattern wins do not typically terminate the bingo game, but can provide an additional award to players having those interim patterns as the game continues.

Typically, however, the prior art systems award the interim awards only when an individual player has matched an interim pattern. These prior art systems compare patterns formed during the ball call on each individual bingo card to predetermined patterns and award the interim awards based upon that individual bingo card matching one of the interim winning patterns. The incident of an interim award is therefore not dependent on multiple players achieving an interim pattern. Alternate prior art systems award interim awards when a player's specially selected symbol is used as part of the award winning interim pattern. Again, in this situation the incident of an interim award is not dependent on multiple players achieving an interim pattern.

Additionally, some players prefer the playing experience associated with traditional "Vegas-style" slot machines over that of a typical bingo games. The slot machine outcomes are based upon the resultant patterns of symbols displayed on the reels, whether electro-mechanical, video, or a combination thereof. However, traditional slot machines are typically subject to more stringent regulatory approval standards by various governing organizations in the gaming industry and could be subject to different economic factors, such as applicable taxes.

As such, it is known in the prior art to present a bingo game outcome to the player by simulating the appearance of the traditional slot machines on a display, whether electro-mechanical, video, or a combination thereof. In this instance, the gaming machine display has the look and feel of a slot machine, but the outcome of the bingo game is determining the outcome and distribution of any awards at that gaming machine. For example, the positioning of the slot reels as displayed at a bingo based gaming machine can be based upon the bingo pattern, or patterns, matched by the player during the bingo game. The award amounts depicted by the gaming machine display device can correspond to the award amounts, including any bonus awards, represented by the bingo patterns obtained by that gaming machine during the occurrence of the bingo game. Therefore, the display device showing the reels displays the results of the bingo game in an alternate fashion. A traditional "bingo card" can also be displayed at the gaming machine and is the ultimate outcome-determining entity of any awards and is usually based upon the ball draw as generated by the central control system, as previously mentioned.

Further, bingo can be viewed as a social game. It can be seen as fun and exciting, in part, because two or more players, such as friends, related players or even unrelated players, can play the same game at the same time. Bingo can also be considered linked because a single event is shared by multiple players. However, a need exists to improve the nature of sharing between multiple individually played gaming machines in a networked bingo game.

Additionally, the excitement associated with a bingo game can be improved with alternate methods of winning the game. These alternate methods preferably increase the availability of awards associated with the game without distracting from the primary game. As such, a need exists to improve the nature of the awards associated with multiple individually played gaming machines in a networked bingo game.

BRIEF SUMMARY OF THE INVENTION

In one aspect, the current disclosure is directed to a system for conducting a multi-player wagered networked bingo game. The system comprises a game controller operatively connected to at least two client devices. Each client device includes an input device configured to accept a plurality of input selections, a display device, a value exchanger configured to accept and dispense value, a client device controller, and at least one playing piece configured to accept a unique game array of game indicia. The client device controller is operatively connected to the input device, the display device, the value exchanger, and the game controller.

The game controller is preferably programmed to operate the networked bingo game upon receiving an input selection from the input device through the controller of each client device. A game controller can be programmed to provide the unique game array of game indicia during the occurrence of a networked bingo game to each client device. The unique game array of game indicia is selected from a range of available game indicia and forms patterns on the playing pieces associated with each client device during the occurrence of the networked bingo game. The game controller can also be programmed to conclude the networked bingo game when at least one pattern on the playing piece of at least one client device matches a game ending pattern.

The game controller can also be programmed to compare a plurality of intermediate patterns on each playing piece associated with each client device to determine if one of the intermediate patterns from the playing piece on at least two different client devices identically matches. The game controller can also be programmed to award an intermediate prize to each client device with the identically matched intermediate pattern and to instruct the client device controller for each client device having the identically matched intermediate pattern to display the occurrence of the identically matched intermediate pattern on the display device.

In another aspect, the current disclosure is directed to a method for operating a multi-player networked bingo game. The method preferably comprises providing at least two playing devices with each playing device configured to accept input from at least one player and providing a game controller configured to operate the networked bingo game. The game controller is preferably programmed to initiate the networked bingo game after accepting an initiating input from at least two playing devices. The game controller can be programmed to provide a player array of game data to each playing device and establish patterns from the player array of game data for each playing device. The game controller can be programmed to determine intermediate patterns from the player array of game devices for each playing device and to determine if at least one intermediate pattern from at least two different playing devices identically matches. The game controller can be programmed to award an intermediate prize to each playing device with the identically matched intermediate pattern and to conclude the networked bingo game when at least one pattern from at least one playing device matches a game ending pattern.

In another aspect, the current disclosure is directed at a method for operating a multiplayer networked bingo game between at least two client devices that are operably connected by a server device. Each client device has at least one playing grid operable to receive a player array of game data from a server device. The method comprises providing the player array of game data from this server device to each client device and establishing patterns on each playing grid at the client devices from the player array of game data during play of the networked bingo game. The method also includes determining intermediate patterns on all playing grids as the networked bingo game progresses and determining if at least one playing grid from at least two different client devices identically matches at least one intermediate pattern. The method further comprises awarding an intermediate prize to each client device with the identically matched intermediate pattern and concluding the network being a match when at least one pattern on at least one playing grid matches a game ending pattern.

DETAILED DESCRIPTION OF THE INVENTION

Figure 1:
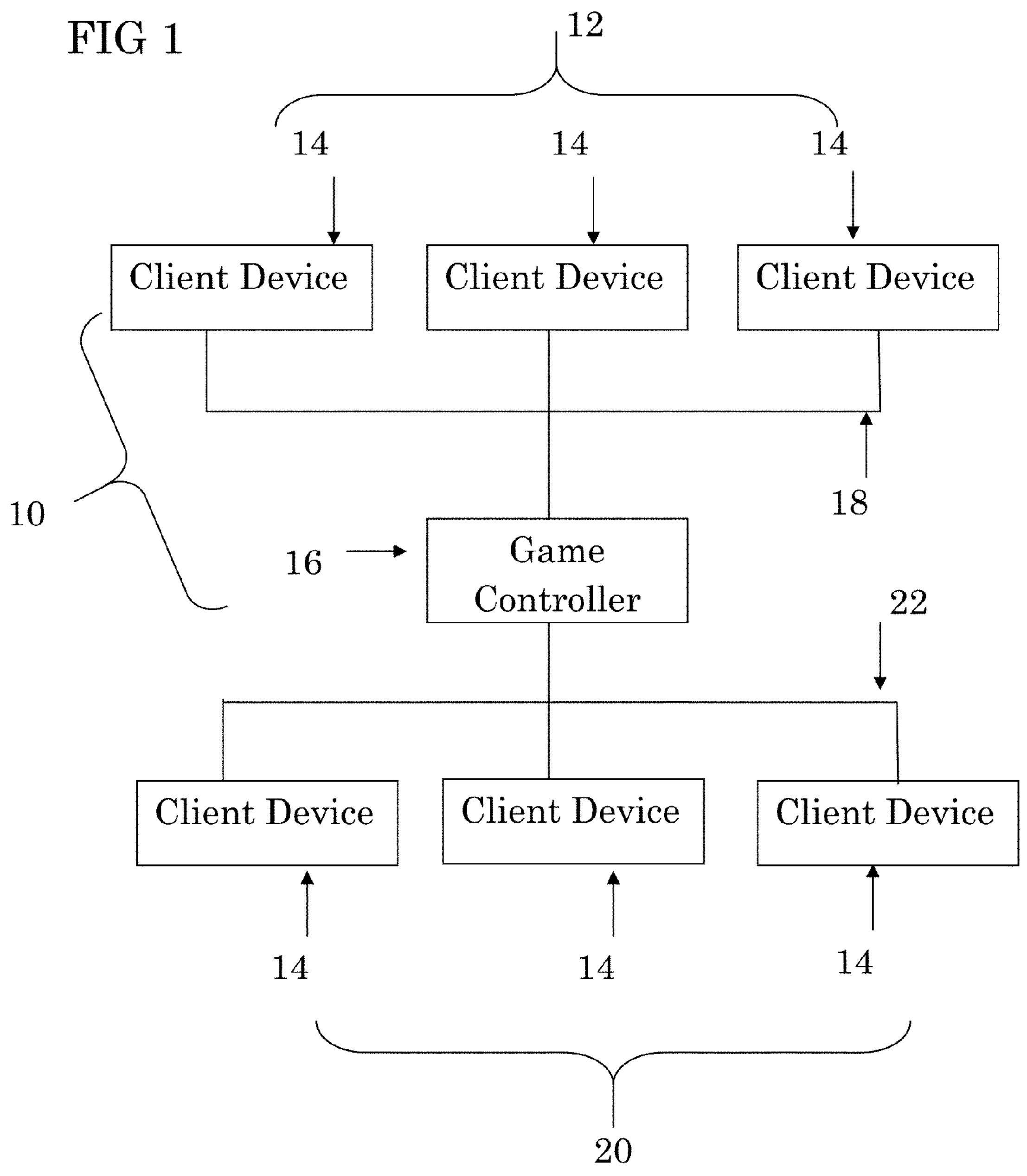
FIG. 1 is a block diagram of an embodiment of a system made in accordance with the current disclosure.
Figure 2:
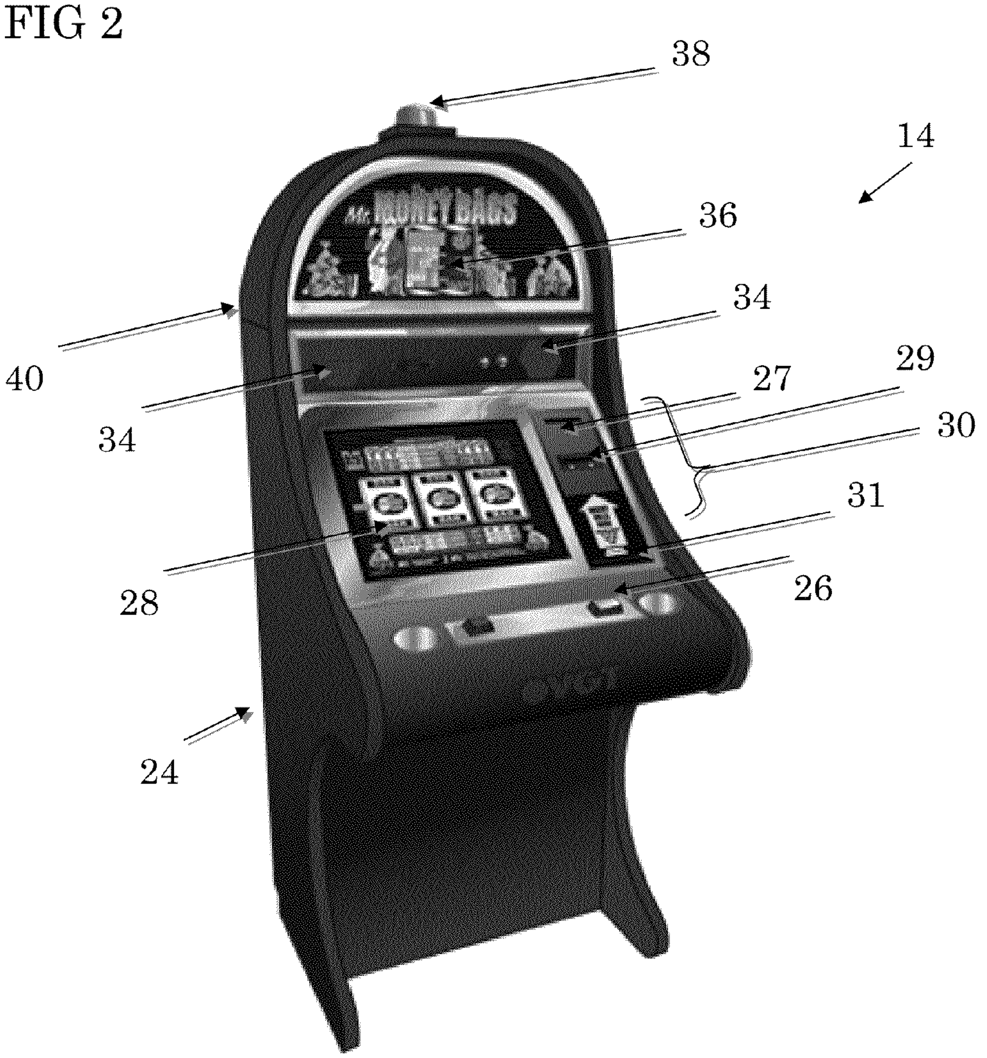
FIG. 2 is a perspective view of an embodiment of a client device made in accordance with the current disclosure.

Referring generally now to FIGS. 1-13, an example of a system for conducting a multiplayer wagered networked bingo game is shown and generally designated by the numeral 10 in FIG. 1. The system 10 may include a first group 12, or network 12, of client devices 14 operably coupled to the game controller 16 via network data link 18, or bus 18. The system 10 can include additional client devices 14 in a second network 20 operably coupled to the game controller 16 through a second network data bus 22. The game controller 16 can also be operably connected to other client devices 14 as desired by the design and scope of the networked bingo game being played. This connection can include, for example, the internet, a wide area network (WAN), or a local area network (LAN) as generally illustrated by the network data links 18 and 22.

The game controller 16 may comprise a computing device with storage, memory, input, output, and processing functions. A traditional server is a preferred example of such a computing device. Preferably the game controller is specifically designed to process the networked bingo game and preferably includes at least one processor, at least one memory, program instructions stored in the memory and executable by the processor to carry out the operation of the networked bingo game, input connection capable of receiving input from input devices, and output connection capable of sending output to external devices, such as the client devices 14, a game controller display device and other computing devices.

The game controller 16 is preferably a single device, but may be a cluster of computing devices as needed to operate the multiplayer networked bingo game. The game controller 16 can include various operating systems as known or available in the art including those that support multiple processes and execution commands in order to support various client devices 14. Preferably the game controller 16 conforms, by itself or in combination with one or more client devices 14, to the standards of one or more gaming regulatory agencies or can be amendable to conform to the standards of such regulatory gaming agencies.

The client device 14 may comprise various computing devices that preferably include at least one processor, at least one memory bank, program instructions stored in memory and executable by the processor, at least one input device, at least one output device, and an operable connection to the game controller 16. The client device 14 preferably includes an operating system that is known in the art and has the capability of interacting with the game controller 16 to facilitate play of the networked bingo game. Preferably the client device 14 conforms, by itself or in combination with one or more client devices 14 and/or the game controller 16, with at least one regulatory gaming authority standards, by itself or in combination with the game controller 16. Preferably the game controller 16 conforms, to the standards of one or more gaming regulatory agencies or can be amendable to conform to the standards of such regulatory gaming agencies In a preferred embodiment, the client device 14 is a casino gaming unit as generally exampled in FIG. 2 or 3. In this embodiment, the client device 14 includes a housing 24, which may also be described as a cabinet 24, which provides the general physical structure to the client device 14. This housing 24 includes various features including at least one input device 26, a display device 28, a value exchanger 30 and a client device controller 32 positioned within the housing. The input device 26 is preferably configured to accept a plurality of input selections from a player using the client device 14. The input device can be integrated into the housing 24, the display device 28, or a combination of both, as generally understood in the art.

The display device 28 is generally used to convey information to the player at the client device 14. This information can include the monetary position of the player, including any credits due to that player, the occurrence of the networked bingo game, the outcome of the proceeding bingo game, game playing instructions, and any other information as desired by the design of the particular bingo game.

The value exchanger 30 can comprise one or more value accepters of various types able to transfer value in tangible, electronic, or digital form. These can include devices that support electronic funds transfer transactions, such as smart phones, computing devices, and other devices capable of electronic funds transfers, or traditional devices, such as a coin accepter 31, a paper currency accepter 29, and a card reader 27. The value exchanger 30, as shown as a card reader 27, paper accepter 29, and coin accepter 31, can be used by a player to submit value to the client device 14 allowing the client device to be eligible for the networked bingo game. The term value may include those forms of value known in the art and regularly used in gaming systems including actual legal tender or any other object representative of value.

The client device 14 in this embodiment may include one or more ancillary devices used to enhance the play of the networked bingo game at the client device 14. For example, these ancillary devices can include one or more speakers 34, a top display 36, and one or more lights 38. The speaker 34, top display 36 and lights 38 may be present in multiple forms and maybe positioned at various locations on the housing 24, such as part of a top box 40 as desired. These ancillary dev can enhance the playing experience for a player using the client device 14 while also providing information to that player and people around or in the general area of the client device 14.

Figure 12:
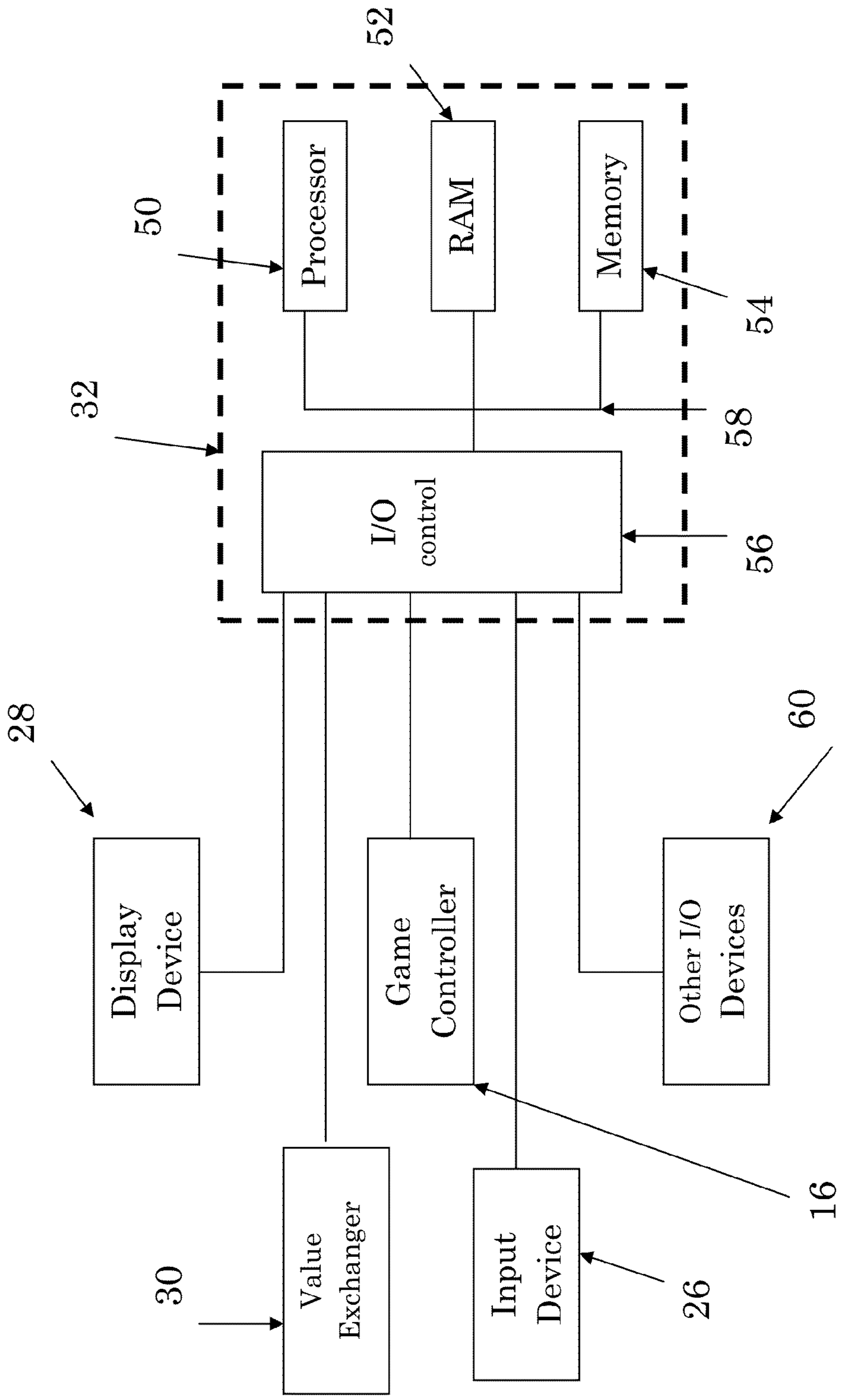
FIG. 12 is a block diagram of the electronic components of an embodiment of a client device made in accordance with the current disclosure.
Figure 13:
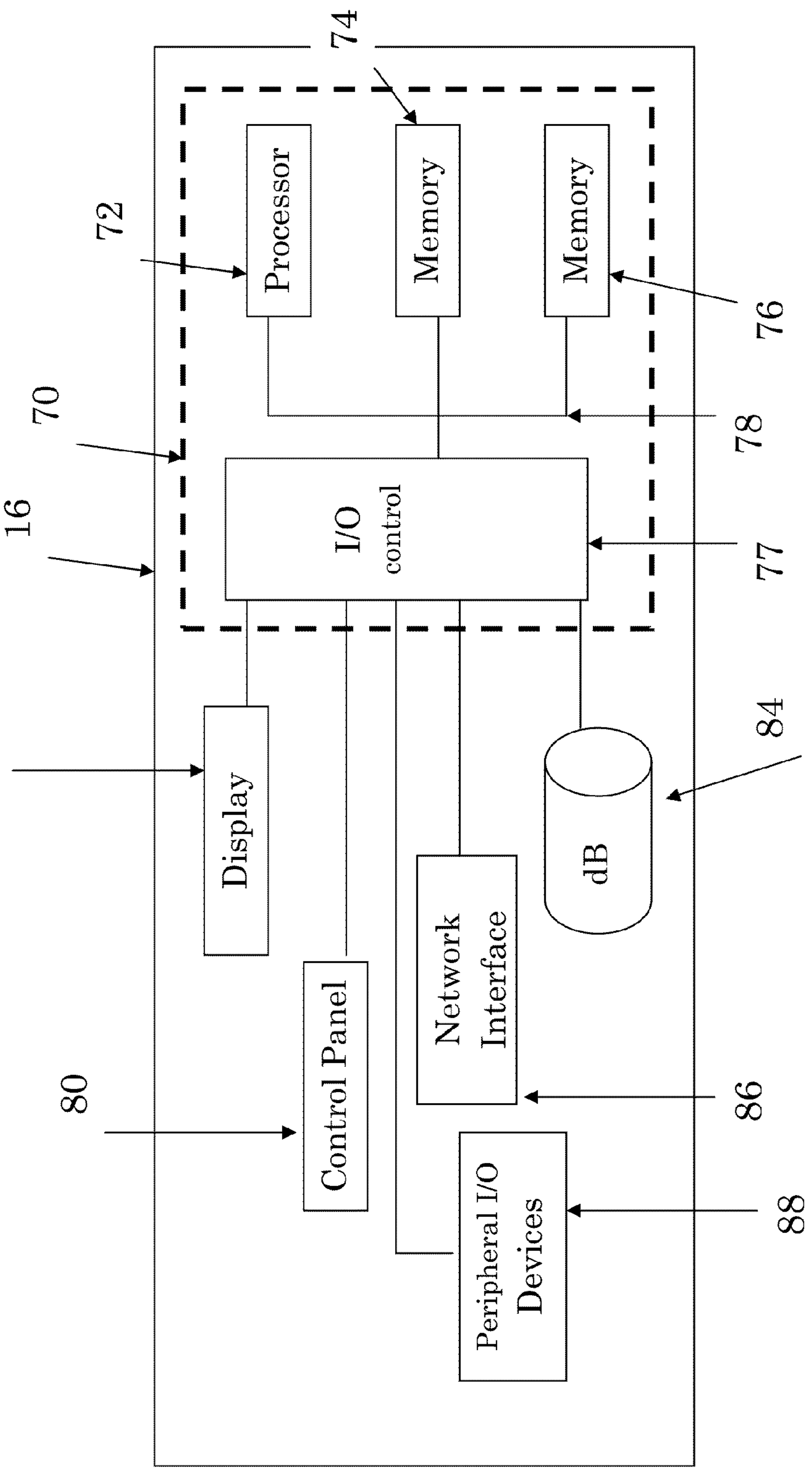
FIG. 13 is a block diagram le of the electronic components of an embodiment of a game controller made in accordance with the current disclosure.

Referring generally to FIG. 12, a block diagram examples one embodiment of various components that may be incorporated into a client device 14. The client device 14 can include a client device controller 32 that can contain a processor 50, a random access memory (RAM) 52, and a second memory 54. These items can be operatively coupled to an input/output (I/O) controller 56 and interconnected via a data bus 58. The client device controller 32 can be further connected to the display device 28, the input device 26, and the value exchanger 30. Additionally, the client device controller 32 can be connected to speakers 34, top display 36, and lights 38, and any other input or output device 60 that can be associated with the client device 14. This block diagram of components is for example purposes only and the actual design can vary as preferred by the owner or operator of the networked bingo game and as dictated by the configurations of the actual client device 14.

A general example of the operation of the client devices 14 in connection with the game controller 16 as used in conducting the multiplayer wagered networked bingo game are generally described below in connection with several flowcharts which can represent various routines or portions of routines used in association with one or more computer programs as present in one or more memories of the client device controller 32 and a game controller 16. As known in the art, the client device controllers 32 and game controller 16 have the capabilities for upgrades and improvements to the operation and hardware components, including additional program instructions as desired for the overall enhancement of the networked bingo game.

The game controller 16 can be described as a server. As exampled in FIG. 13, the game controller 16 preferably includes a central controller 70 configured to control, manage, and execute the routines of the multiplayer networked bingo game. The central controller 70 can include a processor 72, memory 74, and second memory 76. The memory 74 and second memory 76 can be used for storing programs, routines, and software, and data, as needed for the execution of the networked bingo game. These items may be connected as known in the art including a direct connection bus 78. The central controller 70 can further be connected, either directly or indirectly, through an input and output control 77 to various items. For example, the central controller 70 can be connected to a dedicated control panel 80, a display 82, a database 84, network interfaces 86 and other peripheral input and output devices 88 as is known in the art.

Figure 3:
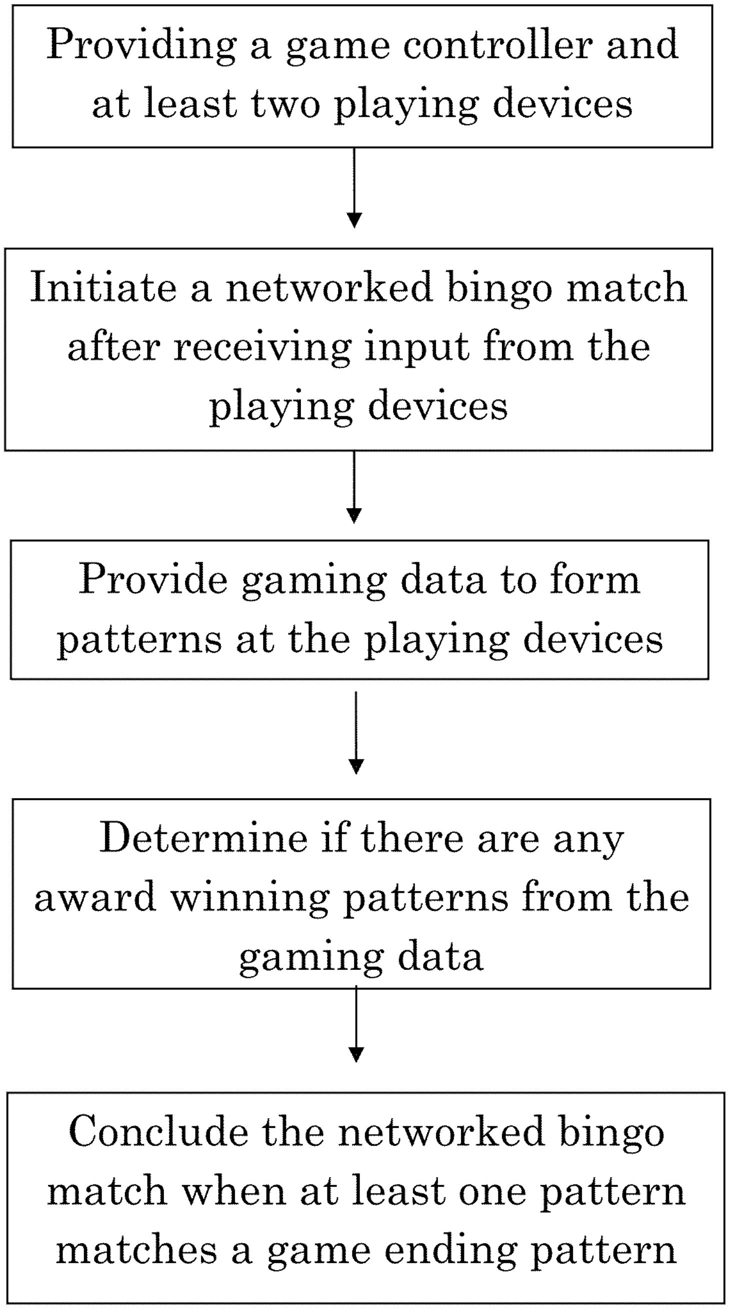
FIG. 3 is a block diagram of a method of operating a multiplayer networked bingo game in accordance with the current disclosure.
Figure 4:
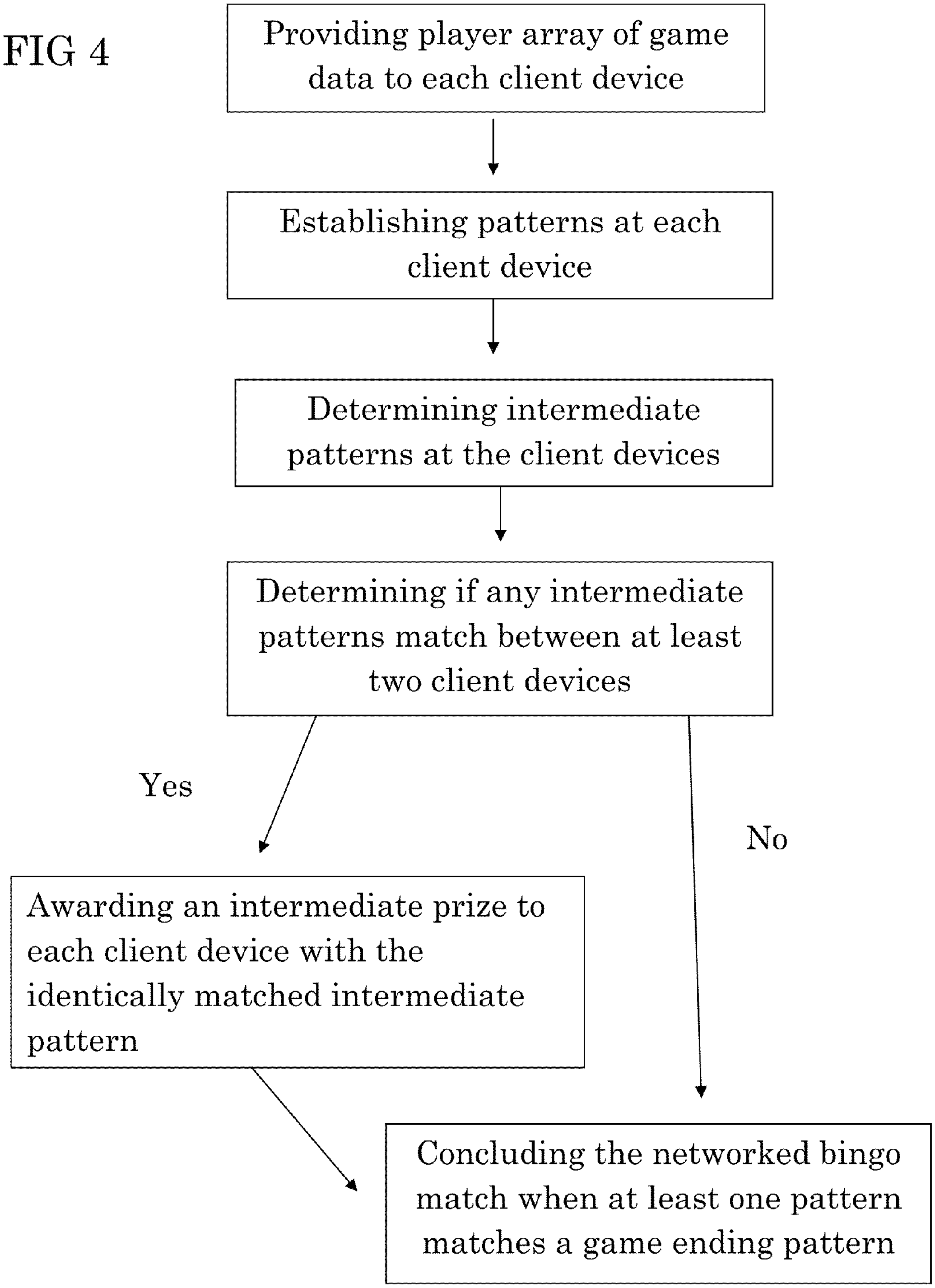
FIG. 4 is another block diagram of a method of operating a multiplayer networked bingo game in accordance with the current disclosure.
Figure 5A:
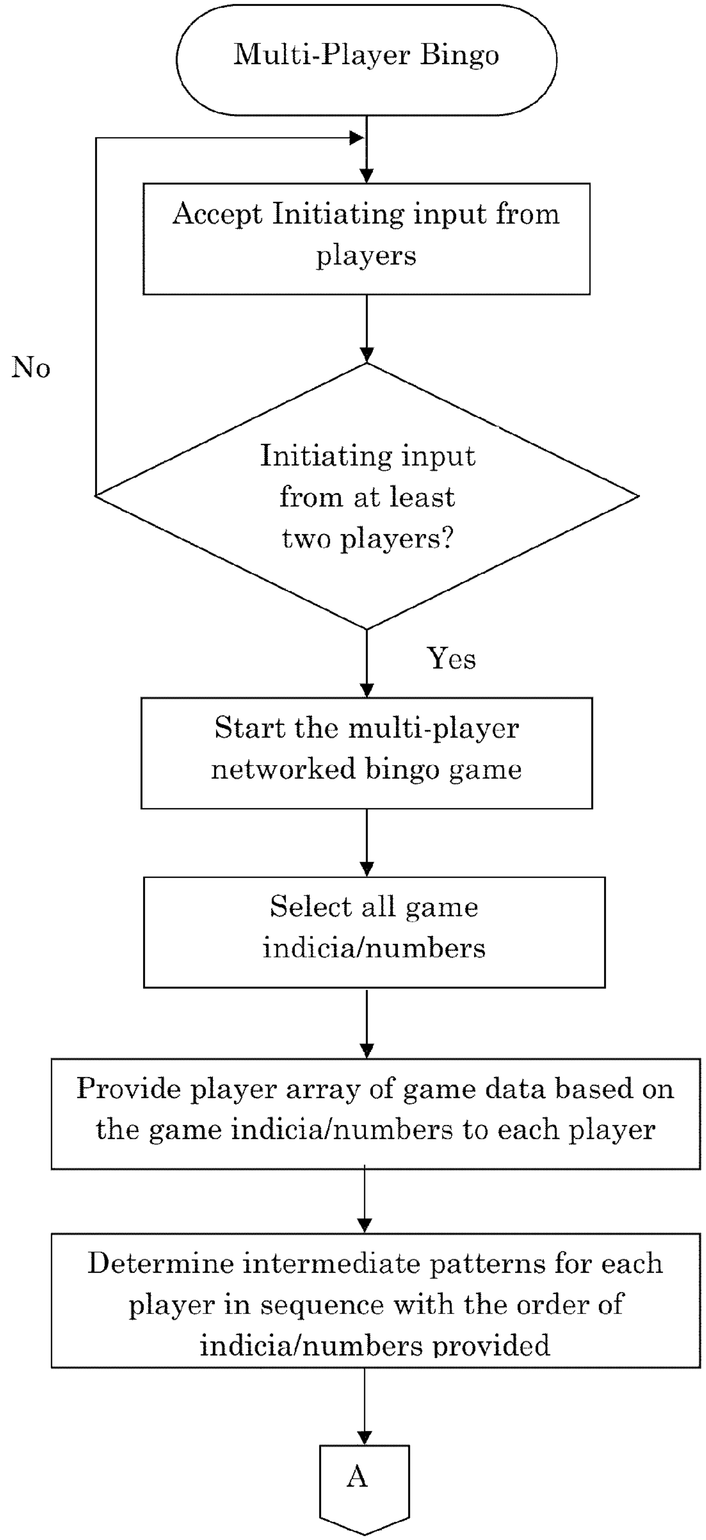
FIGS. 5*a*-5*b* is a flow chart of an embodiment of a multi-player networked bingo game that may be performed as taught by the current disclosure.
Figure 5B:
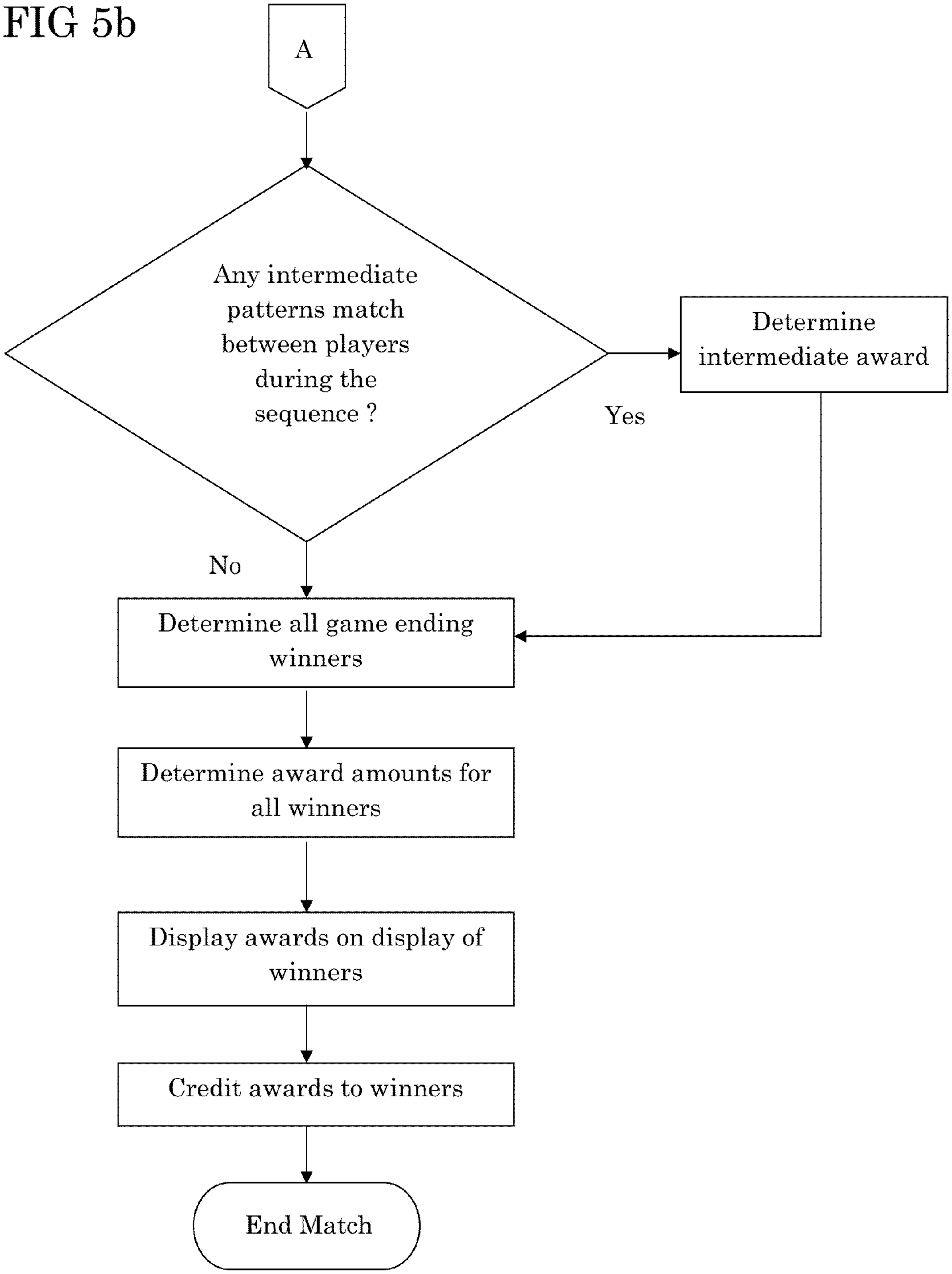
Figure 6:
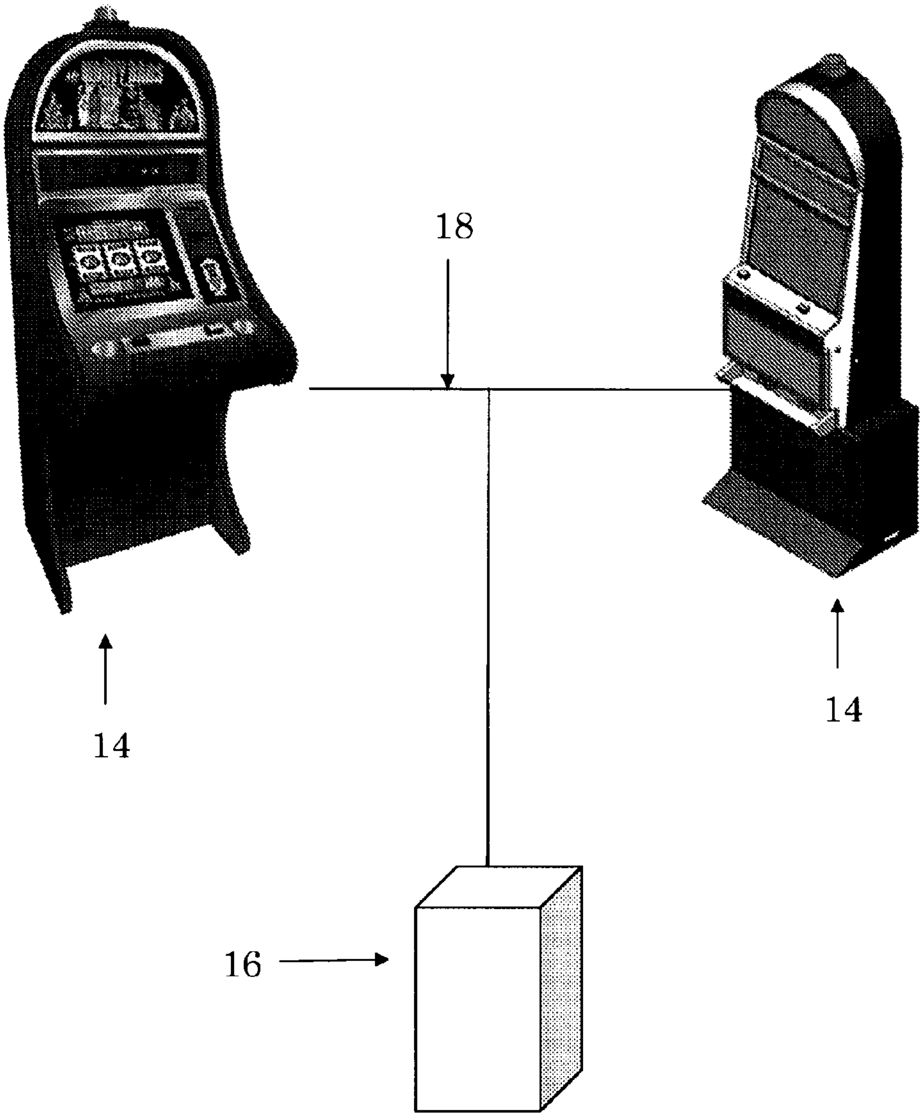
FIG. 6 is a schematic generally showing a system as taught by the current disclosure.
Figure 7A:
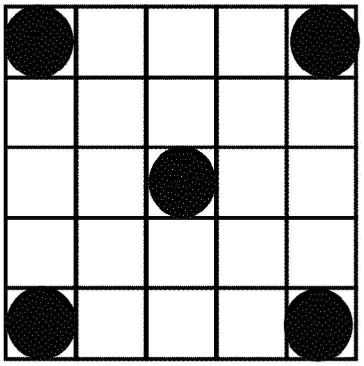
FIGS. 7*a*-7*dd* are examples of intermediate patterns could be used in a multiplayer bingo game as matched intermediate patterns in accordance with the current disclosure.
Figure 7B:
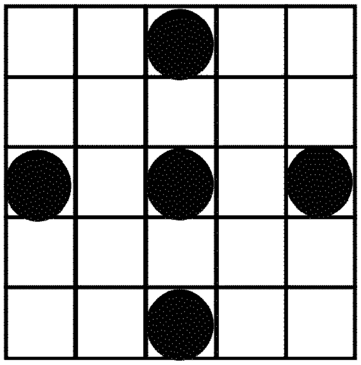
Figure 7C:
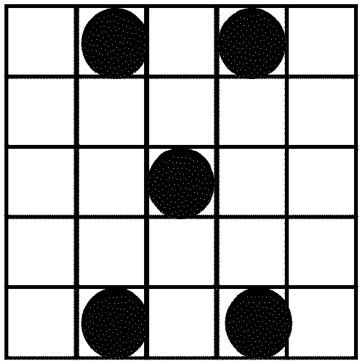
Figure 7D:
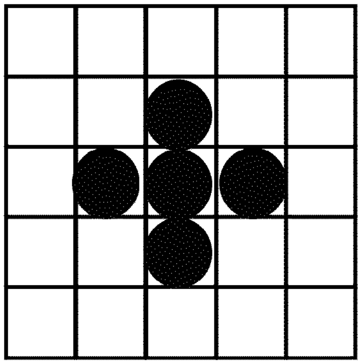
Figure 7E:
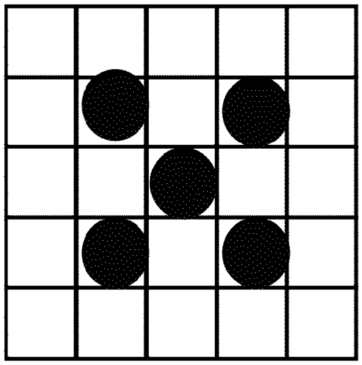
Figure 7F:
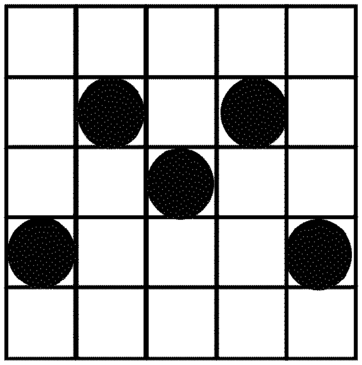
Figure 7G:
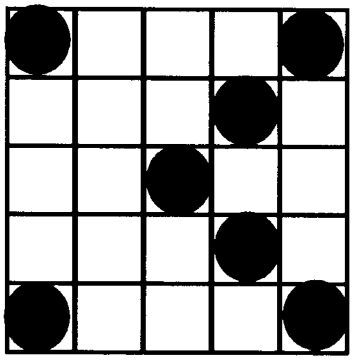
Figure 7H:
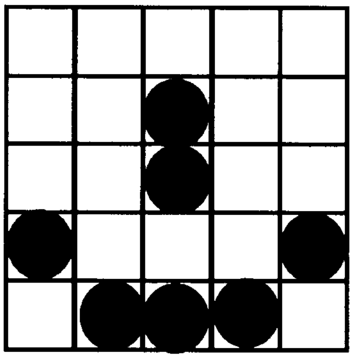
Figure 7I:
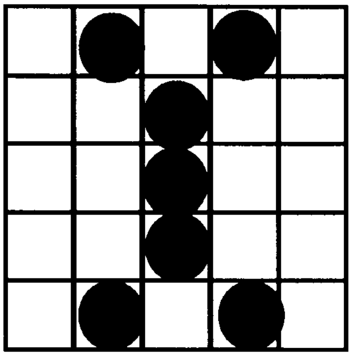
Figure 7J:
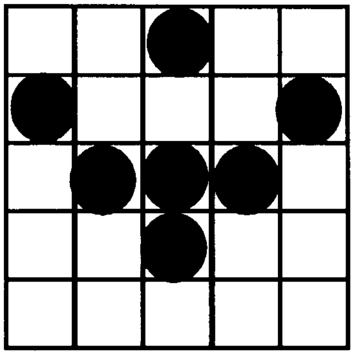
Figure 7K:
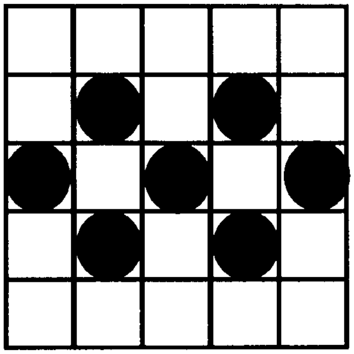
Figure 7L:
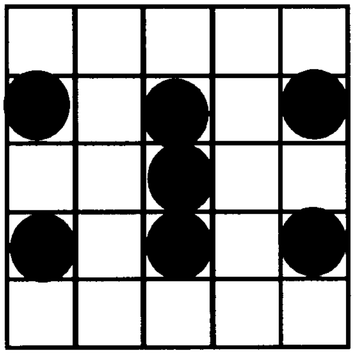
Figure 7M:
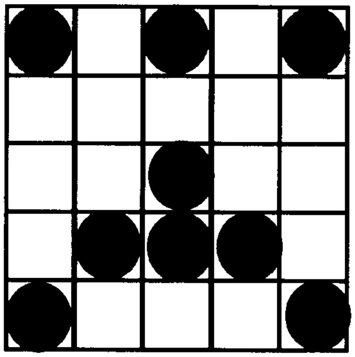
Figure 7N:
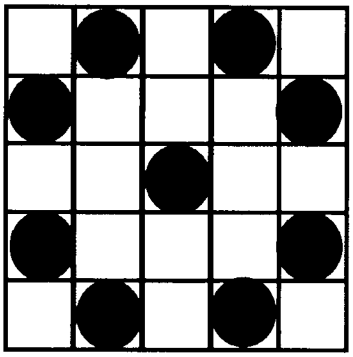
Figure 7O:
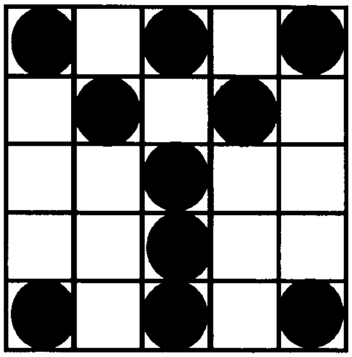
Figure 7P:
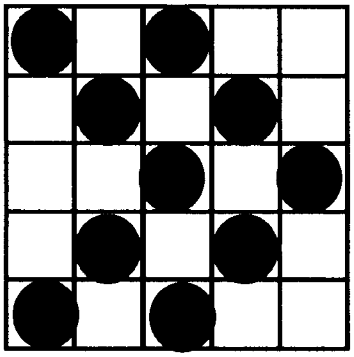
Figure 7Q:
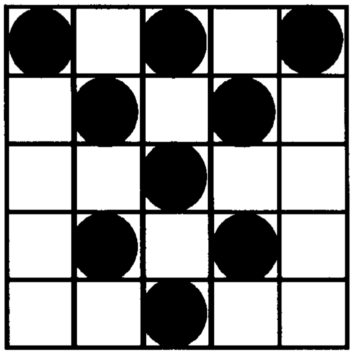
Figure 7R:
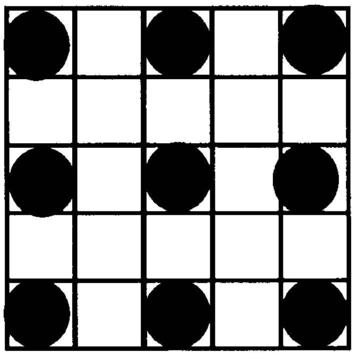
Figure 7S:
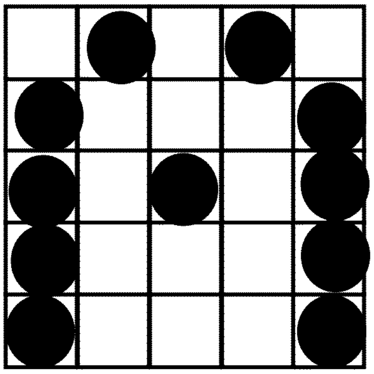
Figure 7T:
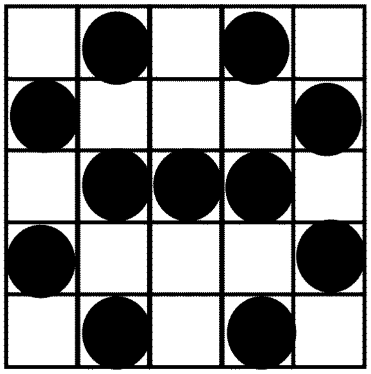
Figure 7U:
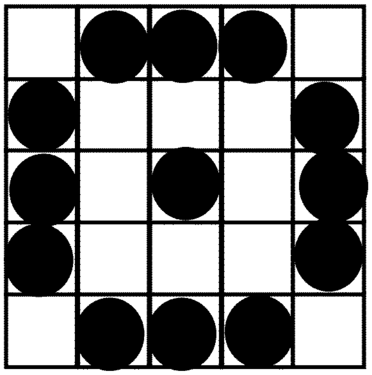
Figure 7V:
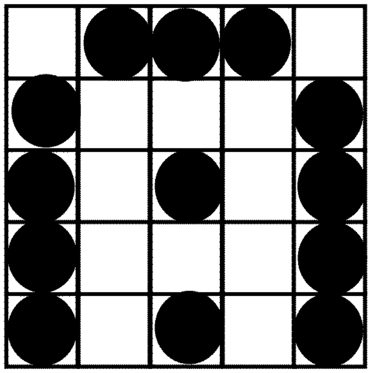
Figure 7W:
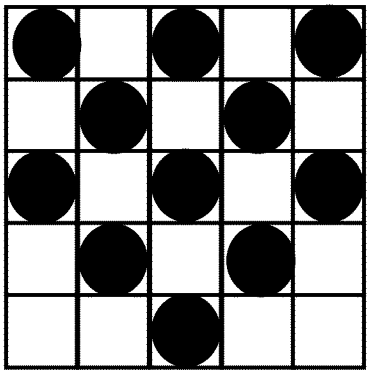
Figure 7X:
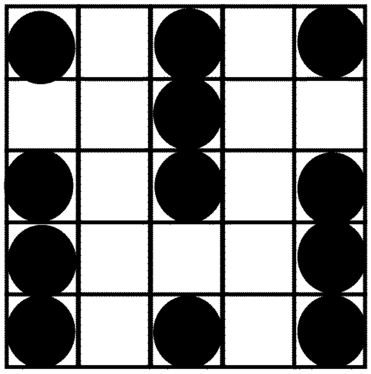
Figure 7Y:
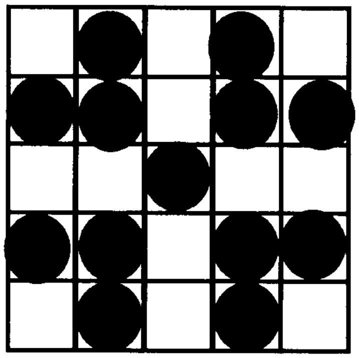
Figure 7Z:
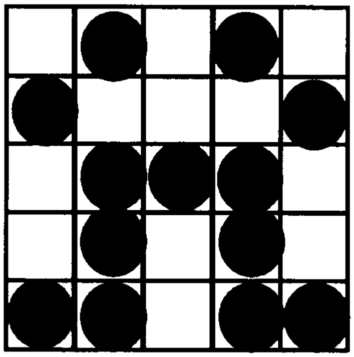
Figure 7A:
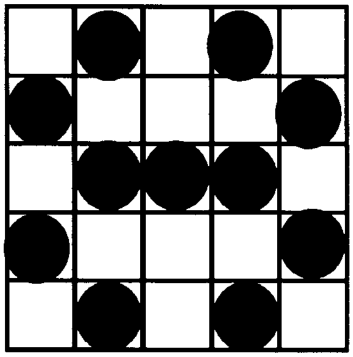
Figure 7B:
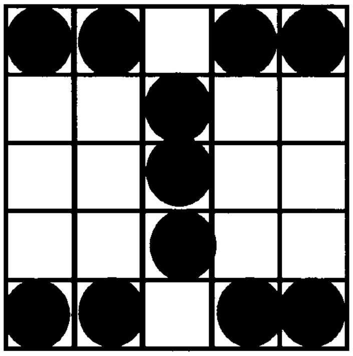
Figure 7C:
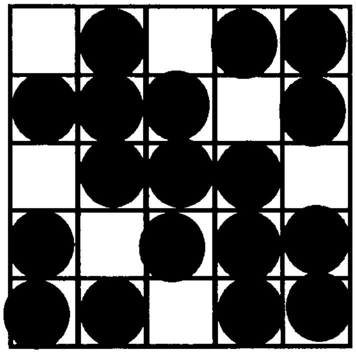
Figure 7D:
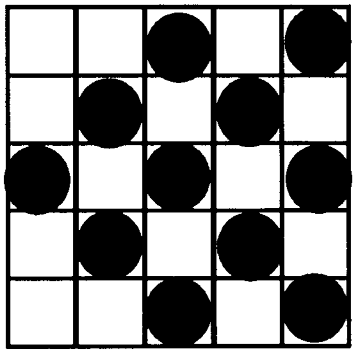

Referring generally now to FIG. 3, a method for the operation of a networked bingo game is generally shown. The steps of this method can include providing a game controller wherein a game controller is provided along with at least two playing devices. The game is initiated when the game controller receives an input from one of the client devices 14, which can also be described as a playing device 14. The input selection from the input device 26 is carried through the client device controller 32 of each client device 14. The game controller 16 is programmed to operate this networked bingo game upon receiving such an input selection. Additionally, the game controller 16 is programmed to provide the unique game array of game indicia during the occurrence of a networked bingo game to each client device 14. The unique game array of game indicia is selected from a range of game indicia establishing the parameters of the potential outcomes for the networked bingo game.

For example, in a standard bingo game, the traditional bingo playing card is a 5×5 matrix of numbers with each column having a number selected from a different range. Traditionally, this range is from 1 to 15 within each column without repeating any numbers throughout the five columns. For example, column 1 has a range of numbers from 1 to 15, column 2 numbers 16 through 30, column 3 numbers 31 through 45, column 4 numbers are 46 through 60, and column 5 numbers from 61 to 75. Traditionally, none of the numbers repeat throughout the columns and there is a "free space" spot deposed in the middle position of the third column which also is the geometric center position of the overall matrix.

As exampled in FIGS. 7*a*-7*dd*, during the operation of the networked bingo game, the unique game array of game indicia forms patterns on those playing pieces, or playing grids associated with each client device 14. The game controller is programmed to compare a plurality of intermediate patterns on each playing piece associated with each client device to determine if one of the intermediate patterns from the playing piece on at least two different client devices identically matches.

For example, after the networked bingo game has concluded, or during the operation of the match after each subsequent ball draw, the game controller will analyze the location of the occurrences of that particular drawn ball on each playing piece. As such, as each number in the traditional bingo arrangement is selected in one of the five columns, the game controller is programmed to analyze the pattern made on each playing piece to determine if multiple playing pieces have the same pattern, such as an identically matched pattern, after the occurrence of each particular number selected.

The game controller is further programmed to award an intermediate prize to each client device 14 with the identically matched intermediate pattern. This can be further accomplished by instructing a client device controller 32 for each client device 14 having the identically matched intermediate pattern display the occurrence of the identically matched intermediate pattern on the display device 26 associated with that client device 14. The game controller is further programmed to conclude the networked bingo game when at least one pattern on the playing piece of at least one client device 14 matches a game ending pattern for the networked bingo game. In traditional bingo games, this game ending pattern is a row, column or diagonal pattern where all five numbers have been called during a ball draw. Alternate bingo games have a game ending pattern when all 25 spaces on a one particular playing piece have been called during the ball draw.

In a preferred embodiment, the game controller is programmed to award the intermediate prize if the identically matched intermediate pattern is from a group of predetermined intermediate patterns. As described, the intermediate patterns can be evaluated during the ball draw until at least one playing piece has a pattern that matches the game ending pattern. Under this situation, the odds of awarding an intermediate award vary with the number of balls drawn and the number of playing pieces utilized in the networked bingo game. This variance can cause an undesirable uncertainty in the value of the awards won during the networked bingo game.

For example, most game designers prefer to achieve a desired payout rate for each wagering game. That rate is typically mandated by the regulatory gaming authority under whose jurisdiction the particular networked bingo game falls. In this situation, the mathematical odds for obtaining a certain pattern, given a certain number of balls drawn during the ball draw can be calculated to provide the mathematical probability of the occurrence of payments or awards to the players playing the bingo game. The preselection of patterns that will qualify as an intermediate pattern by which two or more playing pieces on client devices can match to trigger the intermediate award, further provides a level of mathematical certainty for which the operator of the networked bingo game can use to establish pay rates and comply with gaming regulations.

For example, assume a four ball pattern on a playing piece is obtained after four balls are called in a ball draw. The odds of another player matching this four marked ball call pattern exactly after four balls is much lower than it would be for the two players to match this same pattern after eight balls, ten balls, twelve balls, or more. As such, the odds of any particular intermediate pattern matching on two different playing pieces after a known number of balls can be predetermined. The game designer can then use this known probability of that pattern match occurrence to assign a payment amount based upon the wagered amount. Thereby, the owner and operator of the networked bingo game can establish the desired pay tables based upon those determinable mathematical odds.

Alternately, the game controller can be programmed to accept an input selection from the input device or one of the client devices. As exampled in FIG. 9, this input selection can preselect which of the intermediate patterns from the group of predetermined intermediate patterns should be used to award the intermediate prize. A player can choose from a listing of the preapproved intermediate patterns, for example one of the patterns in FIG. 7*a*-7*dd*, as the desired pattern that player hopes to match during the occurrence of the networked bingo game. This option allows the player to have some control, at least perceived control, in the intermediate award during the networked bingo game. For example, when the player selects only one intermediate pattern available for matching with another player participating in the networked bingo game, that player can effectively reduce the odds of obtaining an intermediate award. The odds of obtaining that particular selected pattern may not change but the odds of obtaining any intermediate pattern match when only one of the available intermediate patterns are selected for matching thereby decreases the players overall chance at winning an intermediate award. As such, the actual value of the intermediate award obtained when that player matches his or her particularly selected intermediate pattern with another player can be calculated and the pay tables for the particular networked bingo game can be established.

In another alternate embodiment, any matched non-game ending pattern could be used to award an intermediate prize. This again will be based upon the mathematical odds calculated for that particular pattern given the number of balls drawn during the ball call. Again in this situation, the game controller could be programmed to vary the value of the intermediate prize with the temporal status of the networked bingo game at the occurrence of the identically matched intermediate pattern. As described before, a two player matched four ball pattern has a greater likelihood of occurrence as the number of balls drawn during the ball call increases. As such, the game controller could preferably be programmed with the mathematical probabilities to award a greater intermediate prize when a fewer number of balls are drawn to create the intermediate pattern as opposed to a larger number of balls drawn to create the same intermediate pattern.

Various patterns could be selected for the intermediate pattern. These patterns could include both a special location upon the playing piece as well as various colors on the playing piece. For example, the intermediate pattern could be set up such that a different occurrence of color among the various balls drawn, or an occurrence of the same color among the balls drawn, could create the intermediate pattern or further affect the intermediate award. The color of the balls could be a separate or enhancing factor in the likelihood of that pattern occurring with that particular color or colors. For example, various balls in the ball draw could have different colors such that a matched four ball pattern in the four corners of the playing grid could pay different amounts based upon the particular colors of the actual balls drawn to make that four ball pattern. If the two matching patterns have the same color for each ball drawn, or alternately four different colors with one for each ball drawn, the amount of the intermediate award could vary. Again, the mathematical odds of the pattern occurring can be adjusted by the various variations in the color of the balls to create the desired pay rates.

Figure 10:
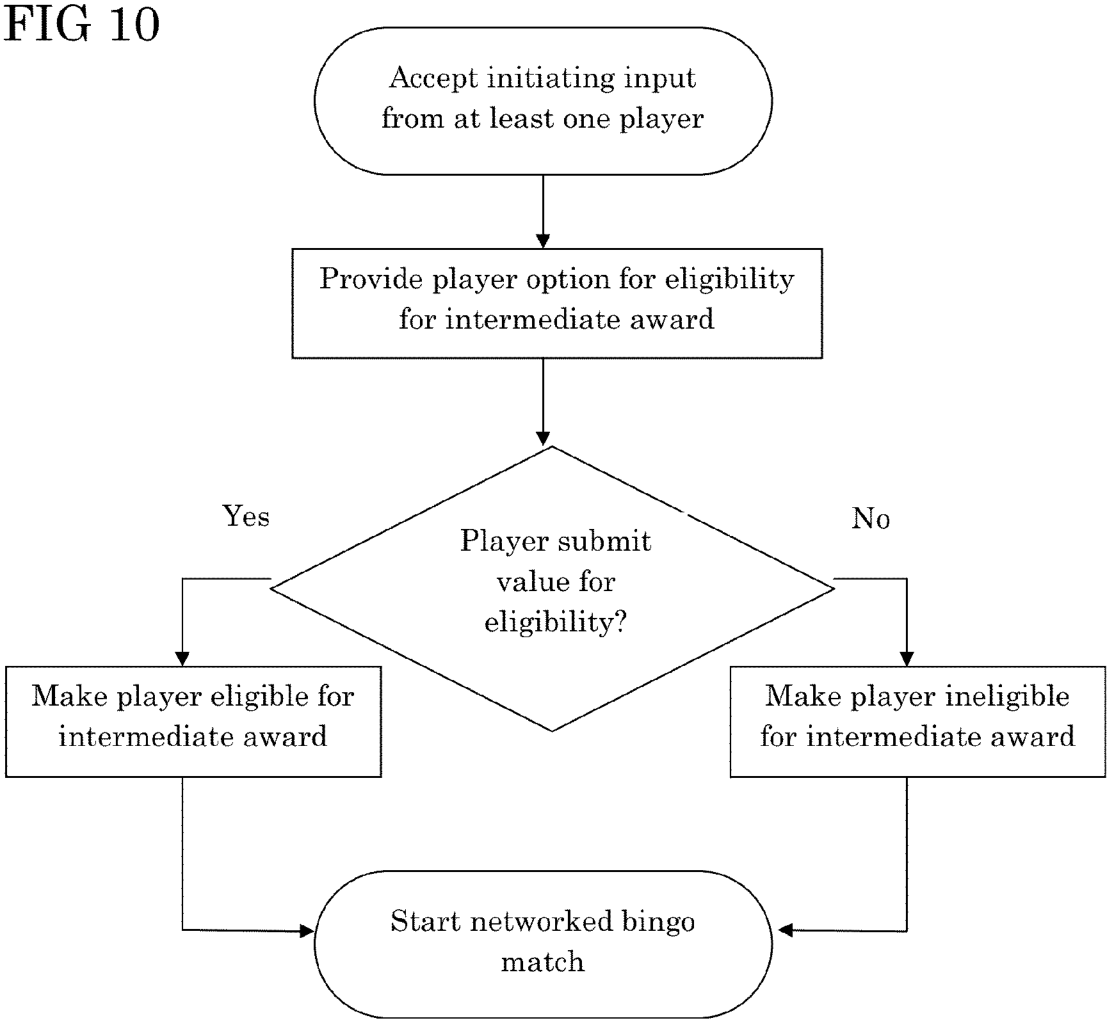
FIG. 10 is a flow chart of an alternate example of initiating input received from at least one player in accordance with the current disclosure.
Figure 11:
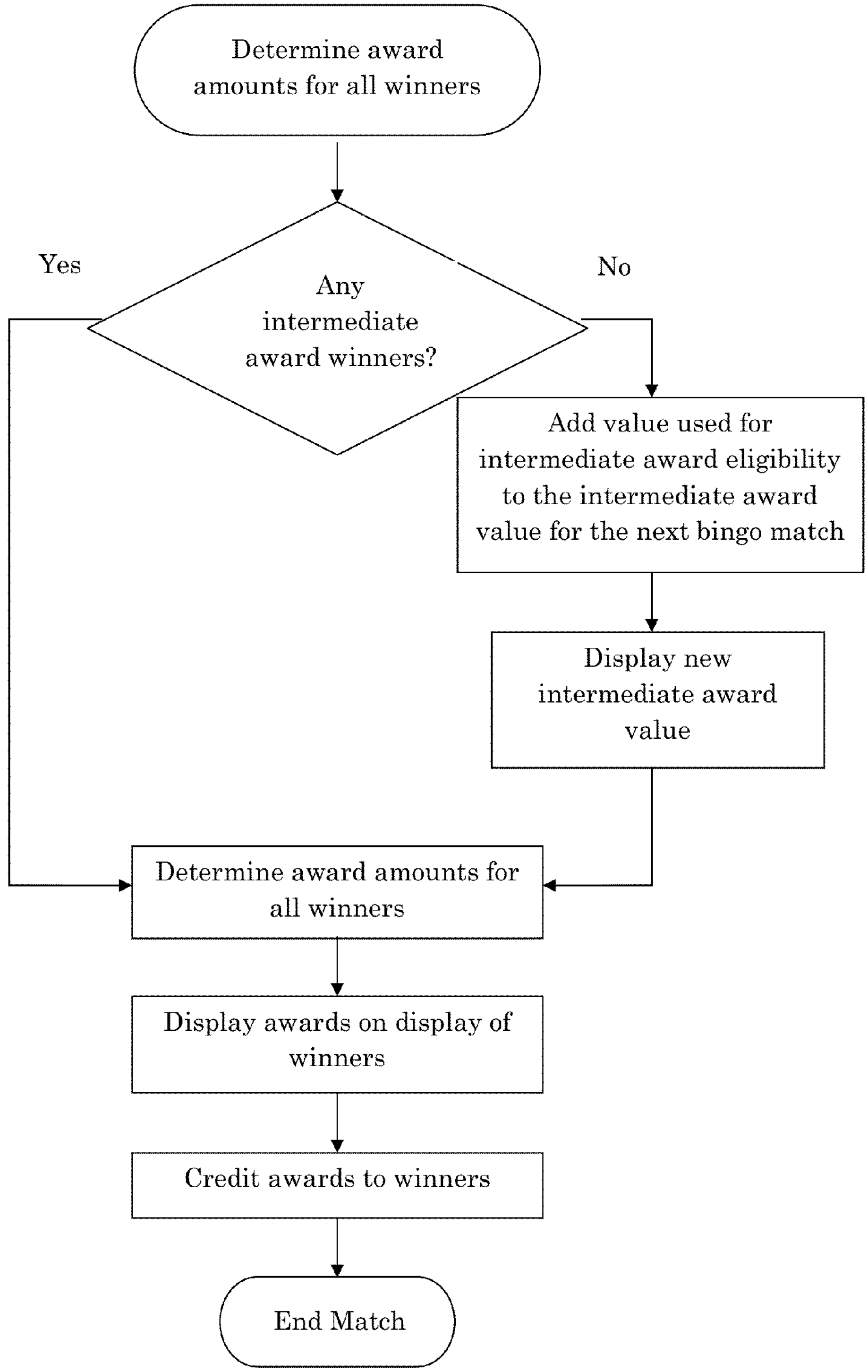
FIG. 11 is a flow chart of an example of progressively increasing the intermediate award value in accordance with the current disclosure.

As exampled in FIG. 10, the eligibility of a client device for the intermediate prize could require a value investment by that client device. Typically, this can occur through the affirmative selection by a player at the client device, for example through an input device, to opt into the availability of the intermediate pattern and prize. For example, the game controller could be programmed to require the player to participate in the "max bet" for that occurrence of the networked bingo game in order for that player to be eligible for the intermediate prize. Alternately, the availability of an intermediate prize could require the player to opt in to an additional wager separate from the wager required to play the primary bingo game.

In either situation, the game controller could be programmed to add at least a portion of the value investment from each eligible client device to the value of the intermediate prize at the conclusion of the networked bingo game when no intermediate prize was awarded. As exampled in FIG. 11, this type of intermediate award can progressively increase and creating a progressive award and/or jackpot associated with the intermediate networked bingo game. This increased value would be available the next time the networked bingo game occurred and could increase excitement and participation in the networked bingo game with the availability of increasingly larger intermediate awards, or jackpots. This increased value for an intermediate award could be displayed in proximity to the client devices 14, such that potentially players of the networked bingo game could be enticed by the possibility of a large award. In this situation, various levels of intermediate awards could be tracked by the "jackpot display" with the various levels of intermediate awards potentially corresponding to various patterns and the likelihood of those patterns based upon a particular number of balls drawn during a ball draw.

The game controller can also be programmed to accept another input selection from the input device of one of the client devices. The input selection could particularly select another client device for an exclusive comparison of any intermediate patterns between those client devices. In this instance, an individual player, through their client device, could select one other client device with which to exclusively attempt to match an intermediate pattern. This option is especially useful when individual players are identified at the client devices by particular login credentials such that other individual players can identify potential friends, colleagues, or others with which to associate or play. This option potentially adds to the social interaction of the networked bingo game and may increase participation in the networked bingo game. The value of the intermediate award can be adjusted according to any adjustment in the mathematical odds of the occurrence of a matched intermediate pattern specifically between the two selected players. These odd can vary since the two selected players are proactively excluding potential matches with other players on other client devices that are playing the networked bingo game.

Also disclosed herein is a method for operating a multiplayer networked bingo game. The method can include providing at least two playing devices with each playing device configured to accept input from at least one player. The method also includes providing a game controller configured to operate the networked bingo game and operatively connected to each playing device. The game controller is programmed to initiate the networked bingo game after accepting an initiating input from at least two playing devices. The initiating input can include the submission of value by each player at the playing device. This value can include the submission of any legal tender or object or representation thereof. The player could then use the playing device to signal his or her desire to play in the networked bingo game. This signal can include the player using an input device associated with a playing device to indicate their desire to play the game. The game controller can also be programmed to provide a player an array of gaming data to each playing device once the networked bingo game is initiated. This player array of gaming data can establish patterns on a playing piece within each playing device. The playing piece can be a digital representation of one of the aforementioned bingo cards as known in a traditional bingo game. The establishment of patterns can occur as the bingo game progresses by the selection of indicia, such as numbers, being selected from a finite grouping of indicia that matches the playing piece associated with the playing devices.

The game controller can be further programmed to determine intermediate patterns from the player array of gaming data for each playing device and then determine if at least one intermediate pattern from at least two different playing devices identically match. As previously stated, the game controller can compare the patterns established on the playing pieces during the occurrence of the bingo game with other playing pieces at other playing devices. A match of patterns can then initiate an award of an intermediate prize to each playing device with the identically matched intermediate pattern as programmed into the game controller. Further, the game controller can be programmed to conclude the networked bingo game when at least one pattern from at least one playing device matches a game ending pattern.

Figure 8A:
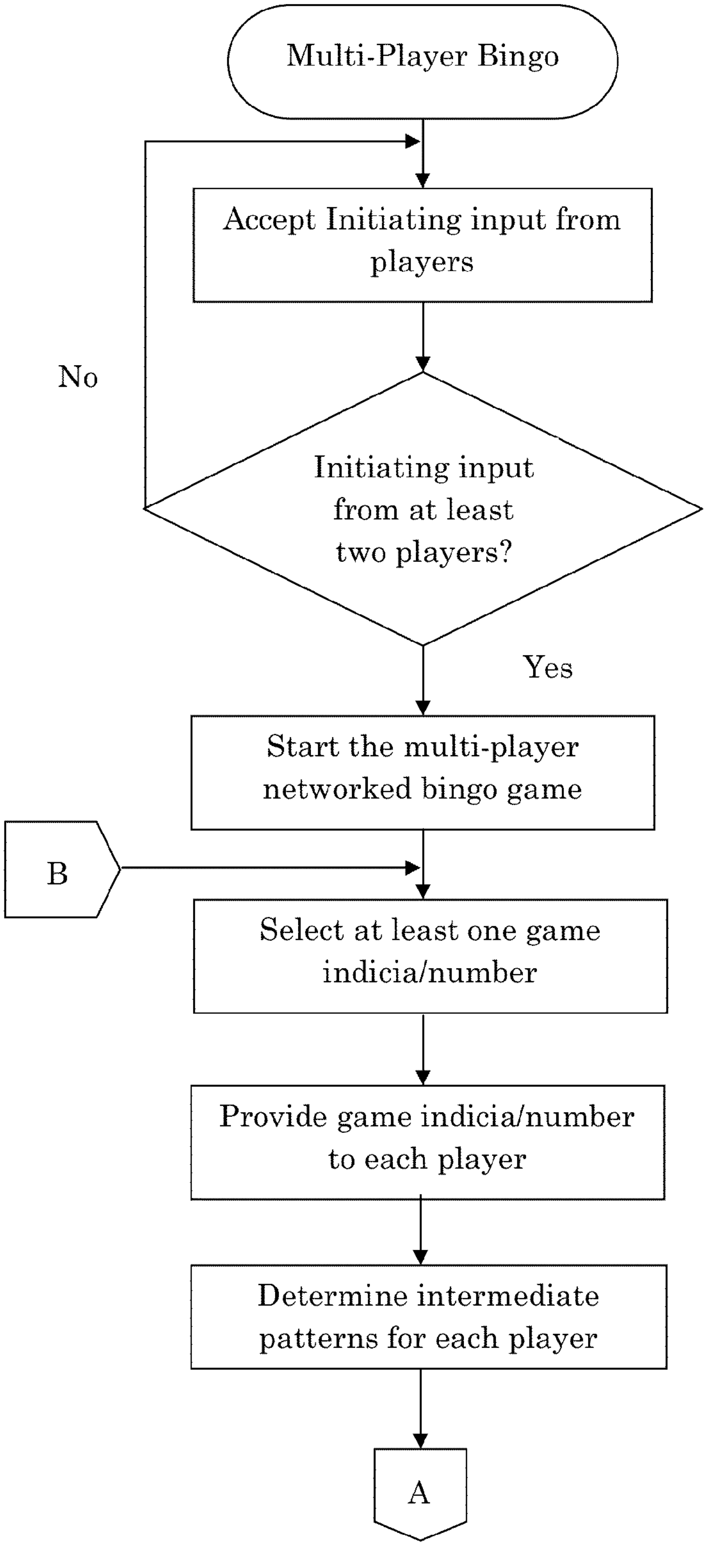
FIG. 8*a*-8*b* is a flow chart of another embodiment of a multiplayer networked bingo game that may be performed in accordance with the current disclosure.
Figure 8B:
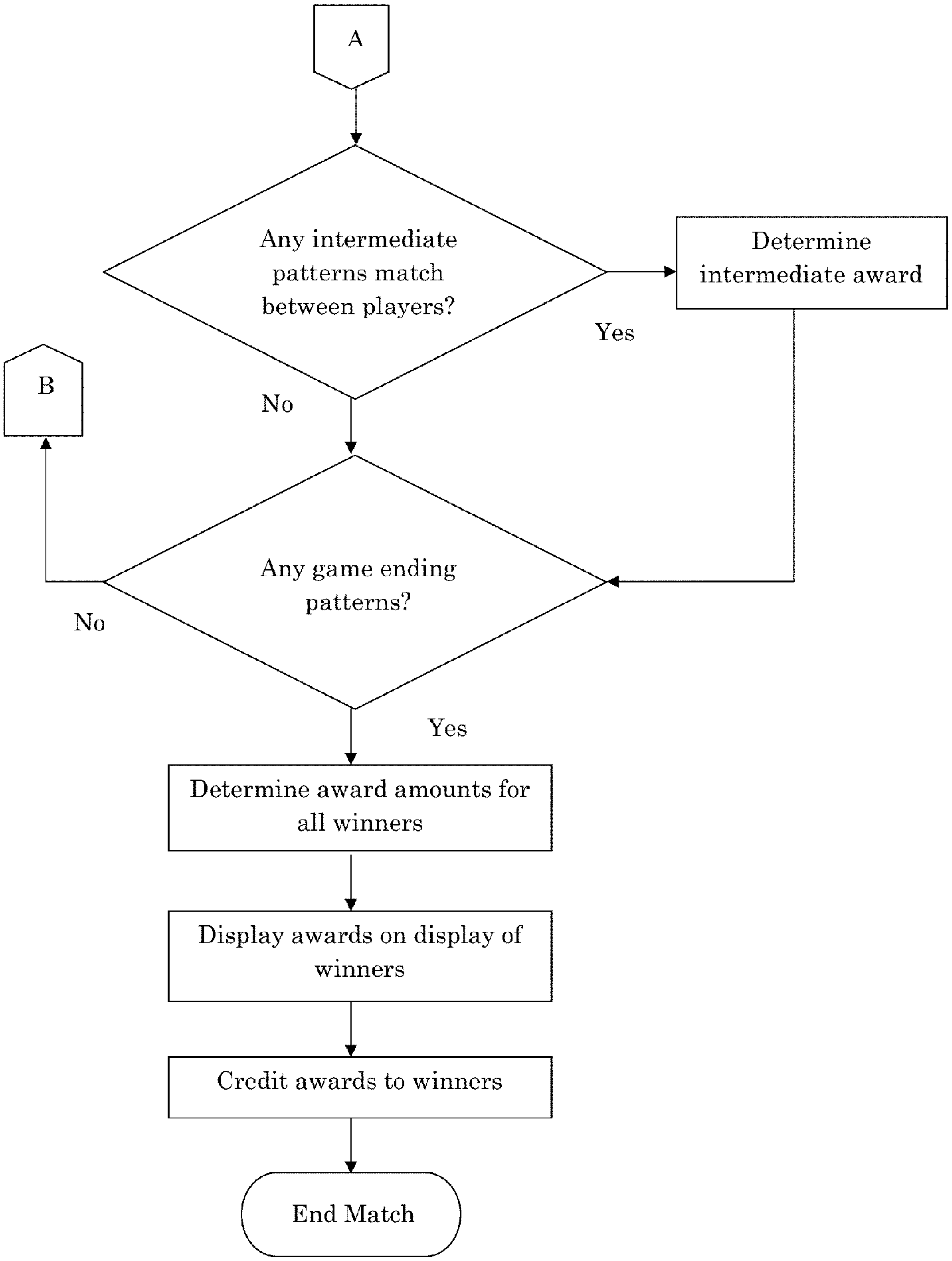
Figure 9:
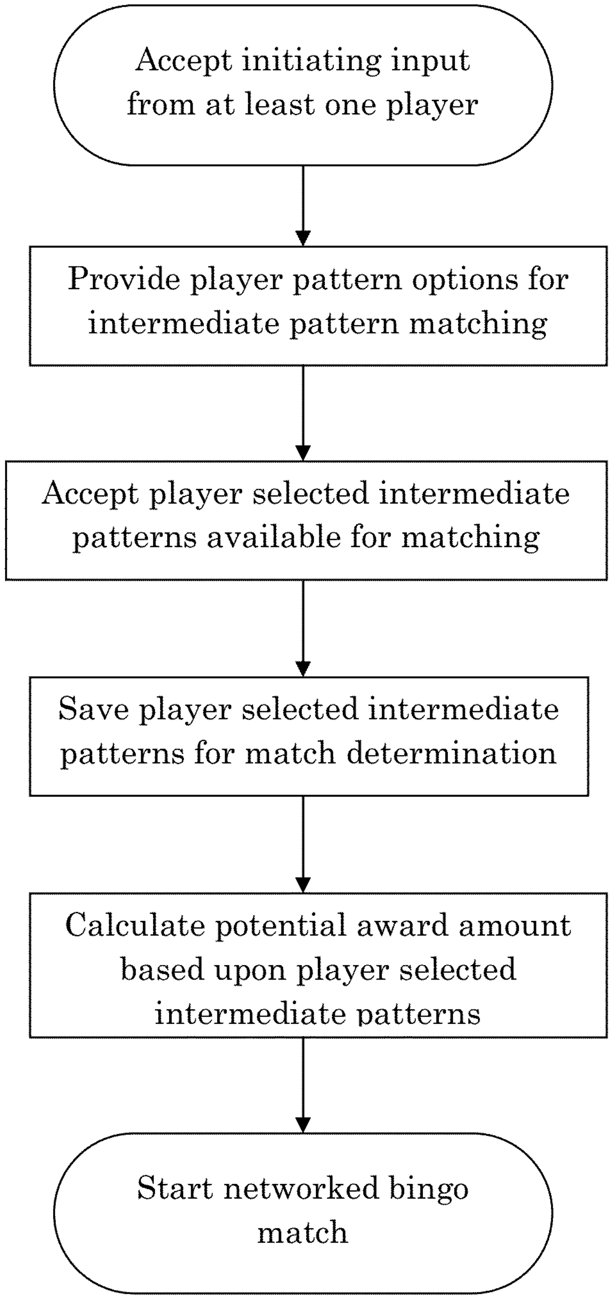
FIG. 9 is a flow chart of an example of initiating input received from at least one player in accordance with the current disclosure.

The game controller can operate as seen in FIGS. 8*a*-8*b*. These flow charts indicate that the game controller initiates the networked bingo game after receiving input from at least two playing devices. The networked bingo game proceeds with the establishment of patterns on playing pieces of the playing devices as traditionally known in a bingo game. The game controller can review each playing piece associated with each playing device after each selection of a game indicia, such as a ball call. The game controller can then analyze to see if any intermediate patterns established by that ball call are matched between two or more playing pieces from two different playing devices. If there is not a match of intermediate patterns, the game controller can continue with the networked bingo game by determining if there is a game ending pattern on a playing piece of at least one playing device. If not, the game controller can continue with another ball call. After this subsequent ball call, again the game controller can analyze to see if there are intermediate pattern matches between playing pieces on playing devices or if there is a game ending pattern on a playing piece of at least one playing device. This game ending pattern would signify the end of the networked bingo game. The game controller will continue with this process until the conclusion of the game ending pattern on at least one playing device.

During this process, the game controller will continue to look for intermediate patterns and can signify to the client devices having the playing devices with the matching intermediate patterns of the occurrence of that match. The game controller can compare the occurrence of the identically matched intermediate pattern in the temporal confines of the bingo game as the number of balls called during the ball draw increases. Alternately, the game controller can wait until the conclusion of the bingo game, by the occurrence of a game ending pattern, then signify to the playing devices both the intermediate pattern match or matches and the conclusion of the bingo game.

Thus, although there have been described particular embodiments of the present invention of a new and useful Multiplayer Bingo With Twin Win Intermediate Award it is not intended that such references be construed as limitations upon the scope of this invention except as set forth in the following claims.

What is claimed is:

1. A system for conducting a multi-player wagered networked bingo game, the system comprising:

a game controller operatively connected to at least two client devices;

each client device including:

an input device configured to accept a plurality of input selections;

a display device;

a value exchanger configured to accept and dispense value;

a client device controller operatively connected to the input device, the display device, the value exchanger, and the game controller; and at least one playing piece configured to accept a unique game array of game indicia;

the game controller programmed to provide the unique game array of game indicia during the occurrence of the networked bingo game to each client device, the unique game array of game indicia selected from a range of available game indicia and forming patterns on the at least one playing piece associated with each client device during the occurrence of the networked bingo game;

the game controller programmed to conclude the networked bingo game when at least one pattern on the playing piece of at least one client device matches a game ending pattern;

the game controller programmed to determine an intermediate pattern of game indicia for each of the at least one playing piece associated with each client device, and to compare each of the respective intermediate patterns on each playing piece associated with each client device with each intermediate pattern on each other client device to determine if one of the plurality of intermediate patterns from the playing piece on at least two different client devices identically match; and the game controller programmed to award an intermediate prize to each client device with the identically matched intermediate pattern by instructing the client device controller for each client device having the identically matched intermediate pattern to display the occurrence of the identically matched intermediate pattern on the display device.

2. The system of claim 1, wherein the unique game array of game indicia includes color variances in the intermediate patterns.

3. The system of claim 1, wherein the game controller is programmed to vary the value of the intermediate prize awarded depending on the number of playing pieces having the identically matched intermediate pattern.

4. The system of claim 1, wherein the game controller is programmed to vary the value of the intermediate prize with the temporal status of the networked bingo game at the occurrence of the identically matched intermediate pattern.

5. The system of claim 1, wherein the eligibility of each client device for the intermediate prize requires a value investment by each client device.

6. The system of claim 5, wherein the game controller is programmed to add at least a portion of the value investment from each eligible client device to the value of the intermediate prize at the conclusion of the networked bingo game when no intermediate prize was awarded.

7. The system of claim 1, wherein the game controller is programmed to accept an input selection from the input devices of one of the client devices, the input selection selecting another client device for an exclusive comparison of intermediate patterns between the selected client device and the one of the client devices from which the input selected was accepted.

8. The system of claim 7, wherein the game controller is programmed to vary the value of the intermediate prize when the input selection selecting another client device is received.

9. The system of claim 1, wherein the game controller is programmed to operate the networked bingo game upon receiving an input selection from the input device through the controller of each client device.

10. A method for operating a multi-player networked bingo game comprising:

providing at least two playing devices, each playing device configured to accept input from at least one player; and providing a game controller configured to operate the networked bingo game, the game controller programmed to:

initiate the networked bingo game after accepting an initiating input from at least two playing devices;

provide a player array of game data to each playing device;

establish patterns from the player array of game data for each playing device;

determine intermediate patterns from the player array of game data for each playing device;

determine if at least one intermediate pattern from at least two different playing devices identically match;

award an intermediate prize to each playing device with the identically matched intermediate pattern; and conclude the networked bingo game when at least one pattern from at least one playing device matches a game ending pattern.

11. The method of claim 10, wherein the identically matched intermediate pattern is partially based upon color.

12. The method of claim 10, wherein the value of the intermediate prize varies depending on the number of playing devices matching the identically matched intermediate pattern.

13. The method of claim 10, wherein the value of the intermediate prize varies with the temporal status of the networked bingo game.

14. The method of claim 10, wherein a playing device's eligibility for the intermediate prize requires a monetary investment by that playing device.

15. The method of claim 14, wherein at least a portion of the monetary investment from each eligible playing device is added to the value of the intermediate prize at the conclusion of the networked bingo game when no intermediate prize was awarded.

16. The method of claim 10, wherein prior to the networked bingo game at least one playing device selects at least one other playing device as an eligible playing device to match the identically matched intermediate pattern.

17. A method for operating a multi-player networked bingo game between at least two client devices operatively connected by a server device, each client device having at least one playing grid operable to receive a player array of game data from the server device, the method comprising:

providing the player array of game data from the server device to each client device;

establishing patterns on each playing grid at the client devices from the player array of game data during play of the networked bingo game;

determining intermediate patterns on all playing grids as the networked bingo game progresses;

determining if at least one playing grid from at least two different client devices identically matched at least one intermediate pattern;

awarding an intermediate prize to each client device with the identically matched intermediate pattern;

concluding the networked bingo game when at least one pattern on at least one playing grid matches a game ending pattern.

18. The method of claim 17, wherein the value of the intermediate prize varies depending on the number of client devices matching the identically matched intermediate pattern.

19. The method of claim 17, wherein the value of the intermediate prize varies with the progression of the networked bingo game.

20. The method of claim 17, wherein eligibility for the intermediate prize requires a monetary investment by each client device.

21. The method of claim 20, wherein at least a portion of the monetary investment by each client device is added to the value of subsequent intermediate prizes if there is not an identically matched intermediate pattern by the conclusion of the networked bingo game.

22. The method of claim 17, wherein prior to the networked bingo game one of the client devices selects at least one other client device as an eligible client device with which to identically match the intermediate pattern.

* * * * *